(12) United States Patent
Misawa

(10) Patent No.: US 7,637,517 B2
(45) Date of Patent: Dec. 29, 2009

(54) VEHICLE HEIGHT ADJUSTMENT SYSTEM

(75) Inventor: Kenya Misawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 145 days.

(21) Appl. No.: 10/857,505

(22) Filed: Jun. 1, 2004

(65) Prior Publication Data
US 2005/0012293 A1 Jan. 20, 2005

(30) Foreign Application Priority Data
Jun. 4, 2003 (JP) ............... 2003-159329

(51) Int. Cl.
*B60G 11/026* (2006.01)
(52) U.S. Cl. ............... 280/124.16; 280/5.514
(58) Field of Classification Search .......... 280/124.157, 280/124.158, 124.159, 124.16, 124.161, 280/5.514
See application file for complete search history.

(56) References Cited

U.S. PATENT DOCUMENTS

| | | | | |
|---|---|---|---|---|
| 4,659,104 | A * | 4/1987 | Tanaka et al. ............ | 280/6.158 |
| 5,344,189 | A * | 9/1994 | Tanaka et al. ............ | 280/6.152 |
| 5,794,924 | A * | 8/1998 | Stolpp ..................... | 267/64.11 |
| 6,161,845 | A * | 12/2000 | Shono et al. .............. | 280/6.15 |
| 6,173,974 | B1 * | 1/2001 | Raad et al. ............... | 280/6.157 |
| 6,266,590 | B1 * | 7/2001 | Kutscher et al. .......... | 701/37 |
| 6,523,845 | B2 * | 2/2003 | Stiller ..................... | 280/124.16 |
| 6,685,174 | B2 * | 2/2004 | Behmenburg et al. .... | 267/64.28 |
| 6,874,772 | B2 * | 4/2005 | Oldenettel ............... | 267/64.28 |
| 2001/0017449 | A1 | 8/2001 | Stiller | |

FOREIGN PATENT DOCUMENTS

| | | |
|---|---|---|
| GB | 2 344 323 A | 6/2000 |
| JP | 02-182520 A | 7/1990 |
| JP | 05-338421 A | 12/1993 |
| JP | 08-108731 A | 4/1996 |
| JP | 2001-246919 A | 9/2001 |

* cited by examiner

*Primary Examiner*—Paul N. Dickson
*Assistant Examiner*—Timothy Wilhelm
(74) *Attorney, Agent, or Firm*—Sughrue Mion, PLLC

(57) ABSTRACT

In order to start vehicle height adjustment control even when an air suspension air tank is empty or sufficient air is not left therein, a vehicle height adjustment system includes a compressor which produces compressed air, a magnetic valve which controls air supply and discharge to/from air springs, a control unit which controls a valve opening/closing operation of the magnetic valve, an air passage which connects between the compressor and the magnetic valve through a main air tank bypassing the air suspension air tank, and an air suspension control pressure switch which detects an internal pressure value of the air passage. The control unit controls start and stop of air supply, namely, start and stop of vehicle height adjustment control at the magnetic valve, based on the internal pressure value detected by the air suspension control pressure switch.

4 Claims, 1 Drawing Sheet

VEHICLE HEIGHT ADJUSTMENT SYSTEM

This application claims priority from Japanese Patent Application No. 2003-159329 filed on Jun. 4, 2003, the disclosure of which is hereby incorporated by reference herein.

BACKGROUND OF THE INVENTION

1. Field of the Invention

The present invention relates to a vehicle height adjustment system for adjusting the vehicle height of a vehicle by supplying/discharging air to/from an air spring.

2. Description of the Related Art

Many large vehicles such as a heavy-duty truck have so-called air suspensions which use air springs as vehicle chassis springs.

Trucks or other large vehicles can secure a given suspension stroke irrespective of the weight of loaded cargos, by keeping the height of a body frame (vehicle height) at a predetermined height from an axle. Accordingly, it is possible to improve the ride comfort and also to reduce the vibration of a cargo bed effectively. The predetermined height is called a reference vehicle height and the value thereof is suitably determined depending on the vehicle model.

In particular, most of the trucks and the like having the air suspension system include a vehicle height adjustment system capable of adjusting the vehicle height by supplying and discharging air to/from the air spring. Specifically, this vehicle height adjustment system adjusts the vehicle height to keep it at a same level in the following manner, for example: a current vehicle height is obtained by detecting a distance between the axle and the body frame; the current vehicle height is compared with a predetermined reference vehicle height; and air is supplied from an air tank to the air spring or discharged from the air spring to the atmosphere, if the current vehicle height is different from the reference vehicle height. Moreover, among the conventional vehicle height adjustment systems, there is the one which obtains the average of vehicle heights measured during a predetermined period of time, and adjusts the vehicle height in accordance with the difference between the average vehicle height and the reference vehicle height, thereby preventing unnecessary consumption of air in the air tank. Here, the vehicle height is adjusted, for example, every time the body swings (see Patent Document 1, for example).

(Patent Document 1) Japanese Patent Laid-Open No. Hei 8(1996)-108731

Such conventional vehicle height adjustment system, however, has its own problem. When the air tank is empty or there is no sufficient air left therein, for example, the conventional vehicle height adjustment system first supplies air to the air tank and measures the internal pressure thereof with a pressure sensor. Then, after the internal pressure of the air tank has become a sufficient value, vehicle height adjustment control is started. That is, the conventional vehicle height adjustment system cannot start the vehicle height adjustment until the internal pressure of the air tank becomes a sufficient value.

SUMMARY OF THE INVENTION

The present invention has been made in consideration of the foregoing situation. An object thereof is to provide a vehicle height adjustment system capable of starting controlling the vehicle height adjustment even when an air tank is empty or sufficient air is not left therein.

The present invention is directed to a vehicle height adjustment system capable of adjusting a vehicle height of a vehicle by supplying air from an air suspension air tank to an air spring or discharging air from the air spring. In order to attain the foregoing object, the vehicle height adjustment system comprises a compressor operable to produce compressed air; an air supply/discharge control valve operable to control air supply and discharge to/from the air spring, the air supply/discharge control valve being provided between the air suspension air tank and the air spring; control means for controlling valve opening and closing operations for supplying and discharging air of the air supply/discharge control valve; an air passage connecting the compressor and the air supply/discharge control valve, bypassing the air suspension air tank; and internal pressure value detection means for detecting a value of an internal pressure in the air passage. Moreover, the control means controls start and stop of air supply control of the air supply/discharge control valve, based on the internal pressure value detected by the internal pressure value detection means.

Herein, the control means stops the air supply control of the air supply/discharge control valve after a predetermined period of time elapses since the internal pressure value detected by the internal pressure value detection means has become equal to or lower than a first internal pressure value. Moreover, the control means starts the air supply control of the air supply/discharge control valve after a predetermined period of time elapses since the internal pressure value detected by the internal pressure value detection means has become equal to or higher than a second internal pressure value.

Furthermore, the present invention is also directed to a vehicle height adjustment system for adjusting a vehicle height of a vehicle by supplying and discharging air to/from an air spring. To attain the foregoing object, the vehicle height adjustment system comprises a compressor operable to produce compressed air; a main air tank for storing the compressed air produced by the compressor and supplying the stored compressed air to an air suspension air system and other air systems; a first protection valve closed when an internal pressure of the main air tank becomes equal to or lower than a first predetermined pressure, and opened when the internal pressure of the main air tank becomes equal to or higher than a second predetermined pressure that is larger than the first predetermined pressure; an air supply/discharge control valve operable to control air supply and discharge to/from the air spring; an air passage connecting the first protection valve and the air supply/discharge control valve; a second protection valve closed when an internal pressure of the air passage becomes equal to or lower than the first predetermined pressure, and opened when the internal pressure of the air passage becomes equal to or higher than the second predetermined pressure; an air suspension air tank for storing the compressed air to be supplied to the air spring, the air suspension air tank being connected with the air passage through the second protection valve; a check valve opened only when an internal pressure of the air suspension air tank is higher than the internal pressure of the air passage, and closed in other cases, the check valve being provided between the air passage and the air suspension air tank; control means for controlling valve opening/closing operations for supplying and discharging air of the air supply/discharge control valve; and internal pressure value detection means for detecting a value of the internal pressure of the air passage. Moreover, the control means stops air supply control of the air supply/discharge control valve after a predetermined period of time elapses, when the internal pressure value detected by the internal pressure value detection means becomes equal to or lower than a first internal pressure value that is lower than values of the first and second predetermined pressures. Furthermore, the control means starts the air supply control of the air supply/discharge control valve after a predetermined period of time elapses, when the internal pressure value detected by the internal pressure value detection means becomes equal to or higher than a second internal pressure value that is lower than the values of the first and second predetermined pressures and higher than the first internal pressure value.

That is, according to the above structure, the air passage connects the compressor and the air supply/discharge control valve, bypassing the air suspension air tank. The air supply control of the air supply/discharge control valve is started/stopped based on the detected internal pressure value of the air passage, not on the detected internal pressure value of the air suspension air tank. Therefore, when performing vehicle height adjustment, it is possible to supply air to the air spring directly from the compressor without supplying through the air suspension air tank. Further, according to this structure, the air supply control of the air supply/discharge control valve is started/stopped after elapse of the predetermined period of time since the internal pressure of the air passage has become equal to or lower than the first internal pressure value or equal to or higher than the second internal pressure value. Therefore, start/stop of the air supply control of the air supply/discharge control valve is not frequently repeated every time the internal pressure of the air passage fluctuates.

BRIEF DESCRIPTION OF THE DRAWING

The above and other features will be better understood from the exemplary embodiment described below, taken together with the drawing, of which

DESCRIPTION OF THE PREFERRED EMBODIMENT

Figure 1:
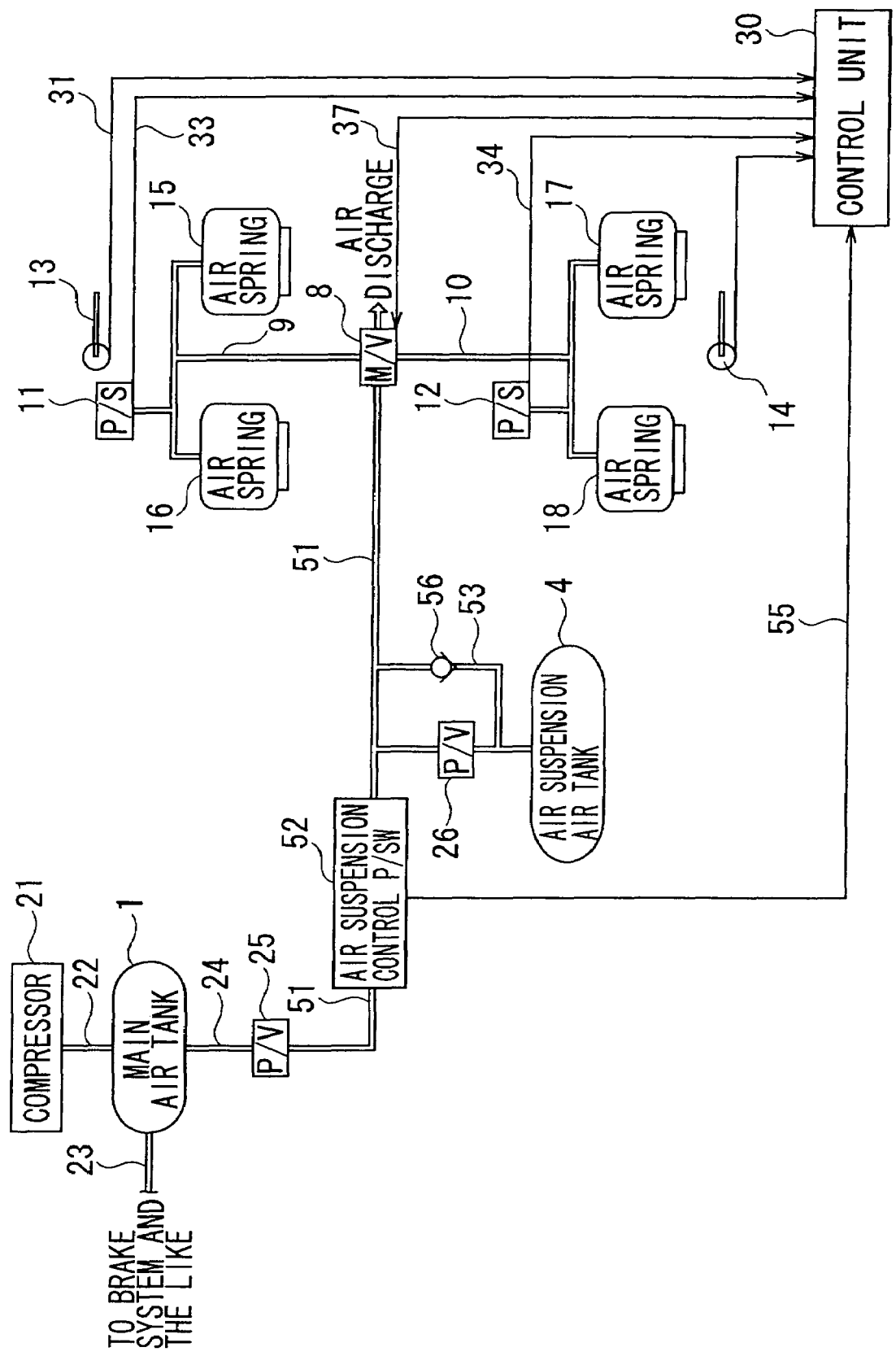
FIG. 1 is a schematic view of the entire air system of a vehicle having a vehicle height adjustment system according to an embodiment of the present invention.

A preferred embodiment of the present invention will be described below with reference to the drawing.

FIG. 1 is a schematic view of an air system in a vehicle as an embodiment including a vehicle height adjustment system of the present invention. Note that, in this embodiment, only a structure on a rear axle side of the vehicle is shown, and a drawing for that on a front axle side is omitted.

In the vehicle according to this embodiment, the rear axle is supported by side members (not shown) with four air springs 15 to 18 interposed therebetween. The air springs 15 and 16 are air springs for a right-rear wheel, and the air springs 17 and 18 are air springs for a left-rear wheel.

An air-supply side of the air system includes a compressor 21 which produces compressed air, a main air tank 1 in which the air from the compressor 21 is stored, and an air suspension air tank 4. The main air tank 1 and the compressor 21 are communicatively connected (hereinafter, described simply as "connected") with each other through an air passage 22. Moreover, the main air tank 1 and the compressor 21 are connected, through an air passage 23, with a low-pressure air system including a brake system (not shown), and with a first single protection valve 25 through an air passage 24.

The first single protection valve 25 is connected, through an air passage 51 according to the present invention, with a magnetic valve 8 which functions as an air supply/discharge control valve according to the present invention, a second single protection valve 26, and a check valve 56. Here, the first single protection valve 25 is a valve closed when the internal pressure of the air passage 24, namely, the internal pressure of the main air tank 1, is equal to or lower than a first predetermined pressure Pc, and opened when the above internal pressure is equal to or higher than a second predetermined pressure Pd (herein, Pc<Pd). The first single protection valve 25 stops the air from flowing into the air passage 51 from the air tank 1 when the internal pressure of the air passage 24 has been reduced to or below the first predetermine pressure Pc due to some cause while the vehicle is running. Thus, the first single protection valve 25 is able to maintain the pressure of air supplied from the main air tank 1 to the low-pressure air system including the brake system (not shown), thereby securing the safety of the vehicle. Note that, in this embodiment, the first predetermined pressure Pc is set to, for example, approximately 7 kg/cm$^2$, and the second predetermined pressure Pd is set to, for example, approximately 8 kg/cm$^2$.

Moreover, the air passage 51 is provided with an air suspension control pressure switch 52 which functions as internal pressure detection means according to the present invention. The air suspension control pressure switch 52 is a sensor capable of detecting first and second predetermined internal pressure values Pa and Pb (herein, Pa<Pb) as internal pressures of the air passage 51. When the internal pressure of the air passage 51 has become equal to or lower than the first predetermined internal pressure value Pa, the air suspension control pressure switch 52 generates a detection signal (hereinafter, referred to as Pa detection signal) indicating that condition, and sends this detection signal to a control unit 30. Further, when the internal pressure of the air passage 51 has become equal or higher than the second predetermined internal pressure value Pb, the air suspension control pressure switch 52 generates a detection signal (hereinafter, referred to as Pb detection signal) indicating that condition, and sends this detection signal to the control unit 30. Note that both of the first and second predetermined internal pressure values Pa and Pb of the air suspension control pressure switch 52 are set lower than the values of the first and second predetermined pressures Pc and Pd of the first single protection valve 25 (that is, Pa, Pb<Pc, Pd). In this embodiment, the first predetermined internal pressure value Pa is set to, for example, approximately 5 kg/cm$^2$, and the second predetermined internal pressure value Pb is set to, for example, approximately 6 kg/cm$^2$.

The second single protection valve 26 is a valve closed when the internal pressure of the air passage 51 is equal to or lower than a first predetermined pressure Pc, and opened when the internal pressure is equal to or higher than a second predetermined pressure Pd. In this embodiment, values of the first and second predetermined pressures Pc and Pd of the second single protection valve 26 are the same values as those of the first and second predetermined pressures Pc and Pd of the first single protection valve 25. The second single protection valve 26 is connected with the air suspension air tank 4 through an air passage 53.

The check valve 56 is connected with the air suspension air tank 4 through the air passage 53. The check valve 56 opens when the internal pressure of the air suspension air tank 4 is higher than that of the air passage 51, and closes when the internal pressure of the air suspension air tank 4 is lower than that of the air passage 51.

The magnetic valve 8 is connected with the air springs 15 and 16 through an air passage 9 as well as with the air springs 17 and 18 through an air passage 10. Open/close control signals sent from the control unit 30 through a signal line 37 control the air supply/discharge operation of the magnetic valve 8 whether to supply air from the air passage 51 to the air springs 15 to 18 or to discharge air from the air springs 15 to 18.

A pressure sensor 11 is provided in the air passage 9, for detecting the internal pressure of the air passage 9, that is, the internal pressures of the air springs 15 and 16. Similarly, a pressure sensor 12 for detecting the internal pressures of the air springs 17 and 18 is provided in the air passage 10. The internal pressure values detected by the pressure sensors 11 and 12 are sent to the control unit 30 through signal lines 33 and 34, respectively.

Moreover, in the vehicle height adjustment system of the present invention, height sensors 13 and 14 are provided, for detecting the vertical position of the rear axle relative to the side members, that is, the vehicle height on the rear axle side. The height sensor 13 detects the vehicle height on the right-rear wheel side, and the height sensor 14 detects the vehicle height on the left-rear wheel side. Then, the vehicle height values detected by these height sensors 13 and 14 are sent to the control unit 30 through signal lines 31 and 32, respectively.

The control unit 30 includes a function as control means according to the present invention. The control unit 30 controls vehicle height adjustment by controlling the magnetic valve 8 so that air from the air passage 51 is supplied to the air springs 15 to 18 or air is discharged from the air springs 15 to 18 to the atmosphere so as to allow the current vehicle height value from the height sensors 13 and 14 to agree with the reference vehicle height value.

Further, the control unit 30 of the vehicle height adjustment system in the present embodiment stops/starts the vehicle height adjustment operation, based on the Pa and Pb detection signals sent from the air suspension control pressure switch 52 through a signal line 55. Specifically, when the internal pressure of the air passage 51 has become equal to or lower than the first predetermined internal pressure value Pa and the Pa detection control signal has been sent from the air suspension control pressure switch 52 through the signal line 55, the control unit 30 closes the magnetic valve 8 after the Pa detection signal has continued for a predetermined period of time Ta. In other words, when the predetermined period of time Ta has elapsed since the internal pressure of the air passage 51 has become equal to or lower than the first predetermined internal pressure value Pa, the control unit 30 of this embodiment does not perform the control for vehicle height adjustment of supplying air from the air passage 51 to the air springs 15 to 18. In contrast, when the internal pressure of the air passage 51 has become equal to or higher than the second predetermined internal pressure value Pb and the Pb detection signal has been sent from the air suspension control pressure switch 52 through the signal line 55, the control unit 30 starts, after the Pb detection signal has continued for a predetermined period of time Th, controlling vehicle height adjustment of supplying air from the air passage 51 to the air springs 15 to 18. In other words, the control unit 30 of this embodiment starts vehicle height adjustment for bringing the current vehicle height into the reference vehicle height, when the predetermined period of time Tb has elapsed since the internal pressure of the air passage 51 has become equal to or higher than the second predetermined internal pressure value Pb. Note that the lengths of the predetermined period of times Ta and Th may be the same or different from each other. In this embodiment, the lengths of the predetermined period of times Ta and Th are set to, for example, 5 seconds.

Hereinafter, for the vehicle height adjustment system of this embodiment, a concrete description will be sequentially given of how air is supplied to each part of the air system in FIG. 1 to adjust the vehicle height. Here, air is supplied when the operation of the compressor 21 is activated in response to a start of the engine after, for example, the compressor 21 is stopped in response to a stop of the engine, and then the air suspension air tank 4 has become empty because the air inside thereof has been consumed or the like. Note that the air system at the time of the engine start is assumed to be in a state where the internal pressure of the air passage 24 is, for example, equal to or lower than the first predetermined pressure Pc, and the predetermined period of time Ta has elapsed since the internal pressure of the air passage 51 has become equal to or lower than the first predetermined internal pressure value Pa. In this case, the first and second single protection valves 25 and 26 are both closed, and the magnetic valve 8 is closed as well.

First, when the compressor 21 starts operating in response to the engine start, air from the compressor 21 is stored in the main air tank 1. At this time, the first single protection valve 25 is kept closed until the internal pressure of the air passage 24, that is, the internal pressure of the main air tank 1, becomes equal to or higher than the second predetermined pressure Pd.

Next, when the internal pressure of the air passage 24 has become equal to or higher than the second predetermined pressure Pd, the first single protection valve 25 opens. When the first single protection valve 25 has opened, air inside the main air tank 1 flows into the air passage 51. At this time, the internal pressure of the air passage 51, of which the internal capacity is extremely smaller than that of the main air tank 1, rises almost instantaneously to the same pressure as the internal pressure of the air passage 24. Moreover, at this time, the air suspension control pressure switch 52 detects that the internal pressure of the air passage 51 has become equal to or higher than the second predetermined pressure value Pb, and the Pb detection signal is therefore sent to the control unit 30. The control unit 30 keeps the magnetic valve 8 closed while the Pb detection signal continues until the predetermined period of time Tb elapses. Accordingly, air which has flowed into the air passage 51 from the main air tank 1 will not be supplied to the air springs 15 to 18 through the magnetic valve 8 until the predetermined period of time Tb elapses. Meanwhile, at this time, the internal pressure of the air passage 51 has already become equal to or higher than the second predetermined pressure Pd. Therefore, the second single protection valve 26 opens, and consequently, air inside the air passage 51, namely, air from the main air tank 1 through the air passage 24 flows into the air suspension air tank 4. Thus, according to the vehicle height adjustment system of this embodiment, air which has flowed into the air passage 51 from the main air tank 1 is to be stored in the air suspension air tank 4 until the predetermined period of time Tb elapses. Note that both the first and second single protection valves 25 and 26 close when the internal pressures of the air passages 24 and 51 have thus become, for example, equal to or lower than the first predetermined pressure Pc. Moreover, the check valve 56 keeps the closing state until the internal pressure of the air suspension air tank 4 becomes higher than the internal pressure of the air passage 51.

Next, when the predetermined period of time Tb has elapsed since the Pb detection signal has been supplied, the control unit 30 starts control of opening/closing the magnetic valve 8 to adjust the vehicle height. That is, the vehicle height adjustment system of the present embodiment starts vehicle height adjustment when the predetermined period of time Tb has elapsed since the internal pressure of the air passage 51 has become equal to or higher than the second predetermined internal pressure value Pb. Here, even if sufficient air is not stored in the air suspension air tank 4, vehicle height adjustment is started using air from the compressor 21 through the main air tank 1. In other words, the vehicle height adjustment system of this embodiment is capable of adjusting the vehicle height even when air is not sufficiently stored in the air suspension air tank 4.

In the above-described vehicle height adjustment, for example, when the internal pressure of the main air tank 1 has gradually decreased and the internal pressures of the air passages 24 and 51 have become equal to or lower than the first predetermined pressure Pc, the first and second single protection valves 25 and 26 are both closed. When the magnetic valve 8 is opened to adjust the vehicle height while the first and second single protection valves 25 and 26 are thus closed, air in the air passage 51, of which the internal capacity is small, is lost. As a result, the internal pressure of the air passage 51 drops sharply. Meanwhile, when the internal pressure of the air passage 51 becomes lower than the internal pressure of the air suspension air tank 4, the check valve 56 opens. Accordingly, air in the air suspension air tank 4 flows into the air passage 51 through the check valve 56. Thus, when the first and second single protection valves 25 and 26 are both closed, the vehicle height adjustment system of this embodiment uses air in the air suspension air tank 4 for vehicle height adjustment. This vehicle height adjustment using air in the air suspension air tank 4 is continued until the predetermined period of time Ta elapses after the internal pressure of the air passage 51 has become equal to or lower than the first predetermined internal pressure value Pa.

Moreover, during the foregoing vehicle height adjustment using air in the air suspension air tank 4, or after vehicle height adjustment is stopped because the predetermined period of time Ta has elapsed since the internal pressure of the air passage 51 has become equal to or lower than the predetermined internal pressure value Pa, air from the compressor 21 is stored in the main air tank 1. When the internal pressure of the main air tank 1, namely, the internal pressure of the air passage 24 becomes equal to or higher than the second predetermined pressure Pd, the first single protection valve 25 is opened. Thereafter, the same operations as the above are respectively repeated.

In the air system of the present embodiment, when the magnetic valve 8 is opened for the above-described vehicle height adjustment while the first and second single protection valves 25 and 26 are closed, the internal pressure of the air passage 51, of which the internal capacity is small, drops sharply down to a value equal to or lower than the first predetermined internal pressure value Pa in reality. At this time, the internal pressure of the air passage 51 becomes lower than that in the air suspension air tank 4, and accordingly, the check valve 56 opens. Air in the air suspension air tank 4 flows into the air passage 51, and the internal pressure of the air passage 51 then becomes approximately the same as that in the air suspension air tank 4. If the internal pressure of the air suspension air tank 4 is an air pressure value equal to or higher than the first predetermined internal pressure value Pa, the internal pressure of the air passage 51 also becomes air pressure equal to or higher than the first predetermined internal pressure value Pa instantaneously. In other words, when the opening/closing operation of the magnetic valve 8 is performed for the above vehicle height adjustment while the first and second single protection valves 25 and 26 are closed, the internal pressure of the air passage 51, of which the internal capacity is small, dramatically fluctuates to go, for example, down to the first predetermined internal pressure value Pa or lower, and up to the second predetermined internal pressure value Pb or higher. Accordingly, for example, if the control unit 30 is a unit which performs control of stopping/starting vehicle height adjustment as soon as the Pa detection signal and the Pb detection signal are supplied from the air suspension control pressure switch 52, the magnetic valve 8 is opened/closed frequently. Therefore, such a unit is not preferable. In contrast, according to this embodiment, waiting times such as the predetermined period of times Ta and Tb are provided before stopping/starting the vehicle height adjustment. Hence, the problem that the magnetic valve 8 is frequently opened/closed will not occur.

As described above, according to the vehicle height adjustment system of the present embodiment, vehicle height adjustment control can be started using air from the compressor 21 without waiting until air is sufficiently stored in the air suspension air tank 4. Moreover, according to the vehicle height adjustment system of the present embodiment, the timing of control for starting/stopping the vehicle height adjustment is delayed by the control unit 30 by the predetermined period of time Ta or Tb, the timing being determined based on the Pa or Pb detection signal from the air suspension control pressure switch 52 that is the internal pressure detection sensor. Therefore, the internal pressure detection value of the air passage 51, of which the internal capacity is small and in which the pressure fluctuates dramatically, can be handled almost equally to the internal pressure detection value of the air suspension air tank 4, of which the internal capacity is large.

Note that the above description of the embodiment is only an example of the present invention. Accordingly, the present invention is not limited to the foregoing embodiment, and it goes without saying that various modifications can be made in accordance with the design and the like within the scope of the technical idea of the present invention. In the embodiment, the description is made only of the case of the rear axle side; however, the vehicle height adjustment system of the present invention also performs similar vehicle height adjustment on the front axel.

As has been described above, according to the present invention, start/stop of the air supply control at the air supply/discharge valve, that is, start/stop of the vehicle height adjustment control is based on the internal pressures of the air passages. Here, air can be injected from the compressor directly to the air springs through the air passages. Hence, the vehicle height adjustment control can be started even when the air suspension air tank is empty or sufficient air is not left therein.

What is claimed is:

1. A vehicle height adjustment system capable of adjusting a vehicle height of a vehicle by supplying air from an air suspension air tank to an air spring or discharging air from the air spring, comprising:

a compressor operable to produce compressed air;

an air supply/discharge control valve operable to control air supply and discharge to/from the air spring, the air supply/discharge control valve being provided between the air suspension air tank and the air spring;

control means for controlling valve opening and closing operations for supplying and discharging air of the air supply/discharge control valve;

an air passage connecting the compressor and the air supply/discharge control valve, bypassing the air suspension air tank;

a protection valve opened and closed according to internal pressure of the air passage, the air suspension air tank connected to the air passage via the protection valve, and internal pressure value detection means for detecting a value of an internal pressure in the air passage, wherein the protection valve is opened only when the internal pressure value of the air passage becomes equal to or higher than a predetermined value, the control means controls start and stop of air supply control of the air supply/discharge control valve, based on the internal pressure value detected by the internal pressure value detection means, the control means staff air supply control of the air supply/discharge control valve when the internal pressure value detected by the internal pressure value detection means becomes equal to or higher than a predetermined internal pressure value, the predetermined internal pressure value is lower than the predetermined value, and the control means allows height adjustment to staff without first charging the air suspension air tank.

2. The vehicle height adjustment system according to claim 1, wherein the control means stops the air supply control of the air supply/discharge control valve after a predetermined period of time elapses since the internal pressure value detected by the internal pressure value detection means has become equal to or lower than a first predetermined internal pressure value.

3. The vehicle height adjustment system according to any one of claims 1 or 2, wherein the control means staffs the air supply control of the air supply/discharge control valve after a predetermined period of time elapses since the internal pressure value detected by the internal pressure value detection means has become equal to or higher than a second predetermined internal pressure value.

4. A vehicle height adjustment system for adjusting a vehicle height of a vehicle by supplying and discharging air to/from an air spring, comprising:

a compressor operable to produce compressed air;

a main air tank for storing the compressed air produced by the compressor and supplying the stored compressed air to an air suspension air system, including an air suspension air tank, and other air systems;

a first protection valve closed when an internal pressure of the main air tank becomes equal to or lower than a first predetermined pressure, and opened when the internal pressure of the main air tank becomes equal to or higher than a second predetermined pressure that is higher than the first predetermined pressure;

an air supply/discharge control valve operable to control air supply and discharge to/from the air spring;

an air passage connecting the first protection valve and the air supply/discharge control valve;

a second protection valve closed when an internal pressure of the air passage becomes equal to or lower than the first predetermined pressure, and opened when the internal pressure of the air passage becomes equal to or higher than the second predetermined pressure;

the air suspension air tank for storing the compressed air to be supplied to the air spring, the air suspension air tank being connected with the air passage through the second protection valve;

a check valve opened only when an internal pressure of the air suspension air tank is higher than the internal pressure of the air passage, and closed in other cases, the check valve being provided between the air passage and the air suspension air tank;

control means for controlling valve opening/closing operations for supplying and discharging air of the air supply/discharge control valve; and internal pressure value detection means for detecting a value of the internal pressure of the air passage, wherein the control means stops air supply control of the air supply/discharge control valve after a predetermined period of time elapses, when the internal pressure value detected by the internal pressure value detection means becomes equal to or lower than a first predetermined internal pressure value that is lower than values of the first and second predetermined pressures, and the control means starts the air supply control of the air supply/discharge control valve after a predetermined period of time elapses, when the internal pressure value detected by the internal pressure value detection means becomes equal to or higher than a second predetermined internal pressure value that is lower than the values of the first and second predetermined pressures and higher than the first predetermined internal pressure value, whereby the control means allows height adjustment to start without first charging the air suspension air tank.

* * * * *